3,654,247
PRODUCTION OF 93–100% ALCOHOLYZED POLY-
VINYL ALCOHOL HAVING LOW COLD WATER
SOLUBLES CONTENT AND IMPROVED SLURRY-
ING PROPERTIES
John E. Bristol, Niagara Falls, N.Y., assignor to E. I. du
Pont de Nemours and Company, Wilmington, Del.
No Drawing. Continuation-in-part of application Ser. No.
707,406, Feb. 23, 1968. This application Feb. 17, 1970,
Ser. No. 12,123
Int. Cl. C08f 3/34
U.S. Cl. 260—86.1 E           13 Claims

ABSTRACT OF THE DISCLOSURE

The cold water solubles content and/or the cold water imbibing tendency of a 93 to 100% alcoholyzed polyvinyl alcohol are reduced by heating at a temperature of 70 to 190° C., preferably 90 to 150° C., a dispersion of the polyvinyl alcohol in a liquid solvent comprising 30 to 100% methanol, 0 to 13% water and 0 to 45% of a 2–5 carbon monohydric alcohol, methyl acetate, acetone, ethylene glycol dimethyl ether, toluene, methylene chloride, or the like. Such heat treatment improves the cold water slurrying properties of the polyvinyl alcohol and increases the room temperature water resistance of coatings and films prepared from the polyvinyl alcohol.

CROSS-REFERENCE TO RELATED CASES

Bristol application, Ser. No. 707,406, filed Feb. 23, 1968, now abandoned, of which this application is a continuation-in-part.

BACKGROUND OF THE INVENTION

Polyvinyl alcohols are generally prepared by the alcoholysis, hydrolysis or saponification of a polyvinyl ester, usually polyvinyl acetate. The conversion of the polyvinyl ester to polyvinyl alcohol is most generally effected in methanol in the presence of an alcoholysis catalyst which is neutralized following the alcoholysis. In a preferred method, the alcoholysis of polyvinyl acetate is effected under conditions such that when the alcoholysis reaction is completed and the catalyst is neutralized, the polyvinyl alcohol is obtained as a slurry in a solvent mixture of methanol and by-product methyl acetate.

It has been observed that at 93 to 100% alcoholysis, i.e., when 93 to 100% of the acetate groups of the parent polyvinyl acetate have been replaced by hydroxyl groups, the polyvinyl alcohol products formed at the instant of completion of the alcoholysis are essentially completely soluble in cold water, i.e., water at room temperatures (20 to about 30° C.), and exhibit poor slurrying properties in cold water. It has been further observed that insolubilization of such products in cold water occurs progressively as a function of time, temperature and composition of the solvent in the neutralized slurry. It has also been observed that for a given residence time of the slurry at a given temperature and solvent composition, the rate of conversion of cold water soluble materials to cold water insoluble materials and the rate of decrease in the cold water imbibing tendency of the polyvinyl alcohol are also a function of the extent of the alcoholysis such that at 99 to 100% alcoholysis, insolubilization of the cold water soluble materials and the decrease of the tendency to imbibe water occur much faster than at lower extents of alcoholysis. However, when the extent of alcoholysis is less than 93% but not less than about 68%, conversion of cold water soluble materials to insoluble materials does not occur at all, consequently, these polyvinyl alcohol products remain essentially completely soluble and are therefore not amenable to treatment in accordance with the invention. When the extent of alcoholysis is less than about 68%, the polyvinyl alcohol products are insoluble in water at temperatures from 1 to 100° C.

Since 93 to 100% alcoholyzed polyvinyl alcohols are most generally used in the form of aqueous solutions, it is highly desirable that they be made available as products from which water solutions thereof can be simply and readily prepared. The most practical and convenient way of preparing such solutions is to prepare a uniform slurry of the product in cold water, then heat the slurry, e.g., at from about 80° C. to the boiling temperature, to effect complete solution. If the initial slurry in cold water is not uniform, e.g., due to lumping, an inordinate amount of heating of the slurry will usually be required to effect complete solution. Thus, the ease both of preparing the initial slurry in cold water and of dissolving the resulting slurry by heating is greatly facilitated by having a polyvinyl alcohol that has good cold water slurrying properties, i.e., can be easily slurried in cold water to give a uniform slurry.

It has been found that in order for a 93 to 100% alcoholyzed polyvinyl alcohol to possess good cold water slurrying properties both its content of materials that are soluble in cold water and its tendency to imbibe water when placed in cold water must be low. While a low content of cold water soluble materials does improve somewhat the cold water slurrying properties of the polyvinyl alcohol, uniform slurrying of such a product in cold water will nevertheless be rather difficult unless it also has a low tendency to imbibe water. As initially prepared, 93 to 100% alcoholyzed polyvinyl alcohols exhibit very poor cold water slurrying properties because they contain relatively high amounts of materials which are soluble in cold water and characteristically imbibe large amounts of cold water when placed therein. The present invention relates to a simple but highly effective way of treating such polyvinyl alcohols whereby both their cold water solubles content and their tendency to imbibe water are drastically reduced, thereby greatly improving their cold water slurrying properties and the ease of preparing water solutions thereof. The treatment in accordance with the invention involves heating at certain temperatures dispersions of the polyvinyl alcohols in a methanol based solvent of the kind specified hereinafter.

Berg et al., U.S. Pat. 2,249,514, which relates to polyvinyl alcohol based friction elements for power transmission, e.g., belts, cables, clutch facings, etc., discloses decreasing the water sensitivity of polyvinyl alcohol by treatment with an insolubilizing agent, e.g., aldehydes or dichromates; heating; or treating with a dehydrating agent, e.g., methyl or ethyl alcohol, which has an affinity for water. No details are given as to how such treatments are to be carried out and apparently they are intended to render the polyvinyl alcohol insensitive to water at all temperatures. Suyama et al., U.S. Pat. 2,890,927, which relates to a multistep method for preparing acetalized polyvinyl alcohol fibers, discloses various heat treatments for rendering polyvinyl alcohol insoluble in cold water but soluble in hot water. One such treatment involves heating the polyvinyl alcohol at 60–110° C. while it is being pulverized in a kneader. Other treatments disclosed for use when the polyvinyl alcohol is in fibrous, film or chip form are: heating it in the dry state at 130–210° C.; and, heating it in the wet state using an ammonium sulfate solution or steam as the heating medium. However, there is no teaching with respect to any treatment in a methanol medium for improving cold water slurrying properties.

The portion of a polyvinyl alcohol which is soluble in cold water is hereinafter referred to simply as the CWS (cold water solubles) content. A method for determining CWS contents is described below. The tendency of a polyvinyl alcohol to imbibe water is directly related to its free water (FW) value, as determined by the procedure described below. In general, the tendency to imbibe water is inversely proportional to its FW value, i.e., the higher the FW value the lower the tendency to imbibe water.

SUMMARY OF THE INVENTION

Polyvinyl alcohols which are 93 to 100% alcoholyzed are subjected to a heat treatment for the purpose of reducing the CWS content and/or the cold water imbibing tendency of the polyvinyl alcohol whereby the cold water slurrying properties of the polyvinyl alcohol are improved. In accordance with the method of the invention, a slurry of a 93 to 100% alcoholyzed polyvinyl alcohol having a high CWS content, and/or a high cold water imbibing tendency is subjected to a heat treatment at a temperature of 70 to 190° C., which slurry is a slurry of the polyvinyl alcohol in a solvent comprising 30 to 100% methanol, 0 to 13% water and 0 to 45% of: a 2 to 5 carbon monohydric alcohol such as ethanol, propanol, butanol and ethylene glycol monomethyl ether; an ester such as methyl acetate, ethyl acetate, ethyl propionate, ethylene glycol monomethyl ether acetate; a ketone such as acetone or methylethyl ketone; an ether such as methyl ether, ethyl ether, ethylene glycol dimethyl ether, dioxan or tetrahydrofuran; a hydrocarbon such as benzene, toluene, heptane, or kerosene; or a chlorinated hydrocarbon such as methylene chloride or chloroform. The time of heating should be sufficient to effect a marked reduction in the CWS content and/or the cold water imbibing tendency of the polyvinyl alcohol, thereby improving its cold water slurrying properties.

DETAILED DESCRIPTION AND PREFERRED EMBODIMENTS

The effectiveness of the heat treatment of the invention in reducing the CWS content and/or the cold water imbibing tendency of the polyvinyl alcohol is dependent upon the composition of the solvent in which the polyvinyl alcohol is dispersed during the heat treatment and also upon the temperature and duration of the heat treatment. The solvent in which the polyvinyl alcohol is dispersed during the heat treatment should be composed of (A) 30 to 100% methanol, (B) 0 to 13% water, and (C) 0 to 45% of a 2 to 5 carbon monohydric aliphatic alcohol, an ester, a ketone, an ether, a hydrocarbon or a chlorohydrocarbon of the type indicated below. The methanol component (A) of the solvent should constitute at least 30% of the solvent and may constitute the entire solvent. In general, the higher the water content of the solvent, i.e., component (B), the more effective is the solvent; however, the water content should not be so high as to result in dissolution of the polyvinyl alcohol in the solvent. For this reason, the water content generally will not exceed 13%, the preferred water content being 5 to 10%. Solvent component (C), if present, will most generally be a 2 to 5 carbon monohydric alcohol such as ethanol, a propanol, a butanol or ethylene glycol monomethyl ether or the like; or an ester such as methyl acetate, ethyl acetate, ethyl propionate, or ethylene glycol monomethyl ether acetate or the like. Since methanol is most commonly employed as the hydrolytic alcohol in the alcoholysis reaction with methyl acetate being formed as the by-product ester, methyl acetate is the most preferred component (C) solvent. However, the component (C) solvent can be a ketone such as acetone or methyl ethyl ketone; an ether such as methyl ether, ethyl ether, glycol dimethyl ether, dioxan or tetrahydrofuran; or a hydrocarbon such as benzene, toluene, heptane or kerosene; or a chlorinated hydrocarbon such as methylene chloride or chloroform in which the polyvinyl alcohol is insoluble. While it is preferred, actually, that the solvent be free of any component (C) solvent, the use of solvent mixtures containing, for example, some methyl acetate will often be most practical simply for the reason that solvent mixtures of methanol and methyl acetate will be commonly available in most alcoholysis operations and will usually be the solvent mixture in which the polyvinyl alcohol will initially be dispersed as a result of the alcoholysis. However, from the standpoint of effectiveness of the solvent mixture in which the polyvinyl alcohol is dispersed during the heat treatment of the invention, the preferred solvent mixture will be one containing 5 to 10% water with the balance being methanol.

As indicated for the preferred solvent or solvent mixtures set forth above, the rate of decreasing the CWS content and/or the water imbibing tendency of the polyvinyl alcohol increases as the methanol content of the solvent phase of the slurry is increased, and as the water content of the solvent is increased up to but excluding an amount of water which will cause the polyvinyl alcohol to go into solution during the heat treatment. Increasing the temperature of the treatment over a range of from 0° C. to the temperature at which the polyvinyl alcohol will decompose (about 200° C.) will also correspondingly increase the rate at which the CWS content and/or the water imbibing tendency are decreased. However, at temperatures below about 70° C., the rate of decrease is usually too slow to be practical. Accordingly, the heat treatment will generally be effected at a temperature of at least 70° C., e.g., 70 to 190° C., with the preferred temperatures being from about 90° C. to about 150° C. for solvent compositions containing the preferred amounts of water, and 100 to 150° C. for solvent compositions devoid of water, under autogeneous pressure. By controlling the time and temperature of the heat treatment and also the composition of the solvent in which the polyvinyl alcohol is dispersed during the heat treatment, the extent of the decrease in the CWS content and/or the water imbibing tendency can be controlled as desired.

The solvent or solvent mixture in which the polyvinyl alcohol is suspended or dispersed during the heat treatment usually must contain methanol in order for the desired effects to be obtained in a practical time, particularly when the polyvinyl alcohol is less than 98% alcoholyzed. Thus, it has been found that when a solvent such as toluene or acetone is used as the sole suspension solvent, the heat treatment is not significantly effective in reducing either the CWS content or the water imbibing tendency. Furthermore, such operations as the vacuum drying or the forced-air drying of polyvinyl alcohol granules at temperatures on the order of 100° C. does not effect any significant reduction in the CWS content or the water imbibing tendency; nor does drying, for example, at 60° C. in air saturated with water. Likewise, storage of dry polyvinyl alcohol at room temperature for a year has not been found to cause any significant reduction in the CWS content or the water imbibing tendency, nor has redrying polyvinyl alcohol at 100° C. for 24 hours.

The duration of the heat treatment in accordance with the invention should be sufficient to effect a substantial reduction in either the CWS content or the cold water imbibing tendency, or both, depending upon the objective. Should the objective be primarily to reduce the CWS content, a heating time of about 30 seconds or so may be sufficient, depending upon the extent of alcoholysis of the polyvinyl alcohol being treated, and the temperature and solvent composition used. On the other hand, if a substantial reduction in both the CWS content and the water imbibing tendency is desired, a somewhat longer time at a given temperature and solvent composition usually will be required. In general, increasing the water content (up to 13%) of a given solvent composition will decrease the temperature and/or the time of heating necessary to achieve a given result. The effect of increasing the amount of the component (C) solvent such as methyl acetate is to increase the temperature and/or the time required. Keeping such interdependence of variables in mind, the effective time of heating at temperatures of 70 to 190° C. range from about 2 hours to 30 seconds. At the preferred temperature of 90 to 150° C., when using a solvent composition containing the preferred amount of water, or at the preferred temperatures 100 to 150° C. when using a solvent composition devoid of water, the effective times of heating will generally range from about 1 hour to 10 minutes. Heating times longer than about 2 hours can be used but generally are not necessary and are more costly. In any case, the time of heating should be sufficient to effect a substantial reduction in either the CWS content or the water imbibing tendency, generally both. Most generally, the time of heating should be sufficient to reduce the CWS content to a value of less than 10%, preferably less than 5%, and to reduce the water imbibing tendency so that the free water (FW) value (determined as described hereinafter) of the treated product will be at least 40%, preferably at least 45%. When these effects of the heat treatment have been achieved, a significant and substantial improvement in the cold water slurrying properties of the polyvinyl alcohol will have been achieved.

The heat treating method of the invention is effective in reducing the CWS content and/or the water imbibing tendency of all 93 to 100% alcoholyzed polyvinyl alcohols obtained by the alcoholysis of the usual homopolymers of vinyl esters such as polyvinyl acetate. It is similarly effective for the same purpose in treating modified polyvinyl alcohols obtained by the alcoholysis of copolymers of a vinyl ester with an amount of methyl methacrylate such that when the copolymer is 93 to 100% alcoholyzed, i.e., alcoholyzed so as to replace 93 to 100% of the acyl groups of the vinyl ester moiety of the copolymer with hydroxyl groups, the resulting modified polyvinyl alcohol product will contain not more than about 6% by weight of the methyl methacrylate moiety of the copolymer. Generally, such methyl methacrylate moiety of the vinyl ester copolymer will be converted during the alcoholysis to its lactone form and will be present in the modified polyvinyl alcohol product in the lactone form in an amount corresponding to not more than 6% methyl methacrylate. Whether applied to such modified polyvinyl alcohols or to such polyvinyl alcohol derived from vinyl ester homopolymers, the heat treating method of the invention effectively reduces the CWS content and/or the water imbibing tendency of the polyvinyl alcohol without causing any significant change in the degree of alcoholysis of the polyvinyl alcohol or any significant increase in its tendency to gel.

The concentration of polyvinyl alcohol in the dispersion or slurry thereof in the solvent during the heat treatment is not critical so long as the amount of solvent present in the slurry is sufficient to wet thoroughly and uniformly the polyvinyl alcohol particles. Concentrations as low as 1% or as high as about 80% can be used, but concentrations as high as posisble while still giving a pourable or pumpable slurry are preferred for economic reasons. Thus, concentrations ranging from about 15 to 25% are generally preferred.

The method of the invention is illustrated by the following examples in which all parts and percentages are by weight.

All CWS percentage values reported herein were determined as follows: A mixture of 8 g. of the polyvinyl alcohol in particulate form and 182 g. of distilled water is agitated at 25° C. with a triple bladed stirrer running at 200 r.p.m. for 1 hour, with water being added to maintain the total weight of the slurry at 200 g. The slurry is then transferred to a 40 ml. centrifuge bottle and centrifuged at 1800 r.p.m. for 30 minutes. An aliquot of the resulting supernatant liquid is evaporated to dryness and the CWS content is calculated as follows:

$$\text{Wt. percent CWS} = \frac{\text{Wt. solids in aliquot} \times 200}{\text{Wt. of aliquot} \times 8} \times 100$$

As indicated previously, the tendency of a 93 to 100% alcoholyzed polyvinyl alcohol to imbibe water then placed in cold water is directly related to its free water (FW) value, the higher the FW value the lower being the tendency to imbibe water. The FW values are determined as follows: 90 g. water at 25° C. is placed in a 200 ml. beaker provided with a magnetic stirrer. While the stirrer is operated so as to pull a vortex to just above the magnet, a 10 g. sample of the polyvinyl alcohol to be tested is sifted into the vortex during an interval of 1 to 3 minutes to insure complete dispersion. After agitating the resulting slurry for 15 minutes, the stirrer is removed and the slurry is transferred to a vertically positioned cylinder which is 6 inches high, has an internal diameter of 2 inches and has a 200 mesh (U.S. Standard Sieve Scale) screen positioned across its bottom end. The liquid which passes through the screen is caught in a tared beaker. Free draining is permitted to proceed for 2 minutes, following which a 200-gram weight ⅛-inch smaller in diameter than the internal diameter of the cylinder and having a 7-inch spindle attached thereto (for handling) is gently placed on the drained cake in the cylinder. The weight is allowed to remain on the cake for 30 seconds, while all liquid draining from the cake is caught in the tared beaker. The latter is then weighed and the free water (FW) value, i.e., the weight of the total drainings, expressed as a percentage based upon the total weight of polyvinyl alcohol plus water, is calculated as follows:

$$\frac{(\text{Weight of drainings})}{100} \times 100 = \text{percent by weight FW}$$

The maximum FW value theoretically possible is 90% but the highest generally obtainable is about 65% because of the water retained in the pores of the polyvinyl alcohol particles and that held interstitially.

Example 1

2500 parts of a 40% solution of polyvinyl acetate in methanol were added together with 250 parts of methyl acetate to a kneader-type reactor which was provided with overlapping sigma agitators running at 60 r.p.m. The polyvinyl acetate employed had a viscosity of 60 cps., when measured as a molar solution (86 grams/liter) in benzene at 20° C. The reactor was jacketed so as to permit the flowing of water at any desired temperature through the jacket, thereby to maintain the contents of the reactor at any desired temperature. After charging the reactor with the above materials, the temperature of the circulating water in the jacket was adjusted so as to bring the contents of the reactor to 50° C. At that point, 10 parts of a 10% solution of sodium methylate in methanol were added over a 30-second interval. Thirty-five to forty minutes were required to reach a power peak, i.e., the maximum power required to continue the running of the agitators at 60 r.p.m. Ten minutes after the power peak had been reached, 30 additional parts of 10% sodium methylate solution in methanol were added continuously over a ten-minute interval, following which the power requirements reached a minimum within 15 minutes and the reactor charge was neutralized with acetic acid 50 minutes later. An aliquot of the neutral slurry of polyvinyl alcohol in a mixture of methanol and methyl acetate then present in the reactor was diluted with an equal volume of methyl acetate, filtered and then washed with 3 successive increments of methyl acetate, each equal in volume of the volume of the initial filtrate. The filter cake product was dried in a vacuum oven at 80° C. for 12 hours. Analysis of the dried product polyvinyl alcohol showed that it was 98% alcoholyzed and had a CWS content of 82%.

Five gallons of the neutralized polyvinyl alcohol slurry product (containing about 8 lbs. of polyvinyl alcohol) were cooled to —10° C. for use in carrying out the tests summarized in Table 1 below. The polyvinyl alcohol component of the slurry had a viscosity of 60 cps., when measured as a 4% solution in water at 20° C. The polyvinyl alcohol employed in the tests of Table 1 was recovered from the above slurry by filtering the slurry, washing it with three incerments of methyl acetate, each increment being equal in volume to the volume of the initial filtrate, and then vacuum drying the filter cake at 80° C. The polyvinyl alcohol so employed had an initial CWS content of 82% and an FW value of 0%. In each of the tests reported in Table I, 20 g. of the polyvinyl alcohol were dispersed in a solvent of the composition indicated and then the dispersion was heated for the time and at the temperature indicated, following which the polyvinyl alcohol was filtered from the slurry, washed three times with methyl acetate, then vacuum dried as previously indicated before the final determinations of its CWS and FW value were made. The results of tests employing dispersion solvents containing varying amounts of methanol (MeOH), methyl acetate (MeOAc) and water at temperatures of 98 to 125° C. are reported in Table I.

Saponification tests upon the samples heat treated as indicated in the above table showed that the extent to which the samples were alcoholyzed was not affected by the heat treatment. Also, 10% solutions of the heat treated products were tested at R.T. for their resistance to gelling during 60 days. No changes in gel resistance were noted. The above data show clearly that the rate of reduction of the CWS content increased as the temperature was increased from 98 to 125° C. and also as the water content of the solvent mixture was increased from 0 to 10%. The minimum CWS values obtainable would be those representing the normal water soluble salt contents, e.g., sodium acetate, of the polyvinyl alcohol, which minimum values generally are about 0.5 to 1% of the weight of the polyvinyl alcohol. The data also show that substantial reductions in the CWS content can initially be obtained without significant improvement in the FW value resulting. However, as the time and/or temperature is increased, the FW values are also improved. The presence of water significantly accelerates both the reduction in CWS content and the improvement in FW value, but its effect is most pronounced on the former. All of the treated materials having both a CWS content not exceeding 10 and an FW value of which slurries dissoved readily when heated at 80 to at least 40% readily gave uniform slurries in cold water, 100° C.

Example 2

The alcoholysis procedure of Example 1 was repeated except that the alcoholysis mixture was neutralized after only 40 minutes (instead of 50 minutes) following the leveling off of the power requirements after the addition of the second increment of sodium methylate. The resulting polyvinyl alcohol was 96% alcoholyzed and had an initial CWS content of 94% and an FW value of 0%. Five gallons of the product slurry were cooled to —10° C. and used for the tests which are summarized in Table II, which

TABLE I.—HEAT TREATMENTS OF 98% ALCOHOLYZED POLYVINYL ALCOHOL

| Test | MeOH, gm. | MeOAc, gm. | H₂O, gm. | Temp., °C. | Time, min. | Final CWS cont., percent | Final FW val., percent |
|---|---|---|---|---|---|---|---|
| A-1 | 60 | 40 |  | 98 | 15 | 17.6 | 0 |
| A-2 | 60 | 40 |  | 98 | 30 | 14.3 | 0 |
| A-3 | 60 | 40 |  | 98 | 60 | 10.2 | 40 |
| A-4 | 60 | 40 |  | 98 | 120 | 5.3 | 50 |
| B-1 | 60 | 40 | 5 | 98 | 15 | 15.7 | 6 |
| B-2 | 60 | 40 | 5 | 98 | 30 | 12.7 | 10 |
| B-3 | 60 | 40 | 5 | 98 | 60 | 7.8 | 56 |
| B-4 | 60 | 40 | 5 | 98 | 120 | 6.0 | 54 |
| C-1 | 60 | 40 | 10 | 98 | 15 | 6.8 | 4 |
| C-2 | 60 | 40 | 10 | 98 | 30 | 5.3 | 14 |
| C-3 | 60 | 40 | 10 | 98 | 60 | 2.9 | 54 |
| C-4 | 60 | 40 | 10 | 98 | 120 | 3.0 | 54 |
| D-1 | 80 | 20 |  | 98 | 15 | 13.9 | 0 |
| D-2 | 80 | 20 |  | 98 | 30 | 7.4 | 14 |
| D-3 | 80 | 20 |  | 98 | 60 | 3.7 | 58 |
| D-4 | 80 | 20 |  | 98 | 120 | 2.3 | 52 |
| E-1 | 80 | 20 | 5 | 98 | 15 | 8.9 | 14 |
| E-2 | 80 | 20 | 5 | 98 | 30 | 6.1 | 30 |
| E-3 | 80 | 20 | 5 | 98 | 60 | 4.0 | 50 |
| E-4 | 80 | 20 | 5 | 98 | 120 | 3.4 | 50 |
| F-1 | 80 | 20 | 10 | 98 | 15 | 4.2 | 16 |
| F-2 | 80 | 20 | 10 | 98 | 30 | 3.4 | 30 |
| F-3 | 80 | 20 | 10 | 98 | 60 | 2.1 | 60 |
| F-4 | 80 | 20 | 10 | 98 | 120 | 1.8 | 60 |
| G-1 | 60 | 40 |  | 125 | 2 | 20.0 | 0 |
| G-2 | 60 | 40 |  | 125 | 4 | 20.0 | 0 |
| G-3 | 60 | 40 |  | 125 | 10 | 15.0 | 0 |
| G-4 | 60 | 40 |  | 125 | 20 | 4.7 | 14 |
| H-1 | 60 | 40 | 5 | 125 | 2 | 17.1 | 0 |
| H-2 | 60 | 40 | 5 | 125 | 4 | 13.1 | 0 |
| H-3 | 60 | 40 | 5 | 125 | 10 | 4.1 | 22 |
| H-4 | 60 | 40 | 5 | 125 | 20 | 1.6 | 60 |
| I-1 | 60 | 40 | 10 | 125 | 2 | 14.0 | 0 |
| I-2 | 60 | 40 | 10 | 125 | 4 | 10.0 | 30 |
| I-3 | 60 | 40 | 10 | 125 | 10 | 1.8 | 50 |
| I-4 | 60 | 40 | 10 | 125 | 20 | 1.7 | 60 | tests were carried out as indicated above for the testing of the product of Example 1.

TABLE II.—HEAT TREATMENTS OF 96% ALCOHOLYZED POLYVINYL ALCOHOL

| Test | Solvent composition | | | Temp., °C. | Time, min. | Final CWS cont., percent | Final FW val., percent |
|---|---|---|---|---|---|---|---|
| | MeOH, gm. | MeOAc, gm. | H₂O, gm. | | | | |
| A-1 | 60 | 40 | | 98 | 15 | 35.0 | 0 |
| A-2 | 60 | 40 | | 98 | 30 | 23.0 | 0 |
| A-3 | 60 | 40 | | 98 | 60 | 18.0 | 15 |
| A-4 | 60 | 40 | | 98 | 120 | 10.0 | 42 |
| B-1 | 60 | 40 | 5 | 98 | 15 | 30.0 | 0 |
| B-2 | 60 | 40 | 5 | 98 | 30 | 18.0 | 16 |
| B-3 | 60 | 40 | 5 | 98 | 60 | 9.6 | 25 |
| B-4 | 60 | 40 | 5 | 98 | 120 | 7.9 | 48 |
| C-1 | 60 | 40 | 10 | 98 | 15 | 12.0 | 6 |
| C-2 | 60 | 40 | 10 | 98 | 30 | 8.0 | 46 |
| C-3 | 60 | 40 | 10 | 98 | 60 | 5.5 | 52 |
| C-4 | 60 | 40 | 10 | 98 | 120 | 4.5 | 54 |

Example 3

One thousand parts of a 40% solution of polyvinyl acetate in methanol were added over a 90-minute period to a glass resin kettle provided with a paddle agitator and a reflux condenser and containing 500 parts of a 4% solution of sodium methylate in methanol. The polyvinyl acetate employed had a viscosity of 60 cps., when measured as a molar solution (86 grams/liter) in benzene at 20° C. The resin kettle was placed in a water bath at 40° C. so that with the agitator running at 200 r.p.m., the contents of the kettle were maintained at 35° C. Agitation of the contents of the kettle was continued for 30 minutes after the addition of the polyvinyl acetate solution, whereupon the contents were neutralized with glacial acetic acid then immediately cooled to −10° C. Methyl acetate cooled to −10° C. was then added in an amount equal to the weight of the slurry following which the mixture was filtered and washed with 3 successive increments of cold methyl acetate, each increment being equal in volume to the volume of the filtrate from the initial filtration. The washed product was then dried in a vacuum oven at 80° C. for 10 hours. The dry product polyvinyl alcohol was found upon analysis to be 99.7% alcoholyzed, to have a CWS content of 60%, an FW value of about 4%, and a viscosity of 59 cps. when measured as a 4% water solution at 20° C. This product was then used in tests as described in Example 1 with the results which are summarized in Table III.

values being 45%, 52% and 54%, respectively. Three samples of a 97.3% alcoholyzed polyvinyl alcohol having an initial CWS content of 79% and an FW value of 0% were heat-treated while dispersed in ethylene glycol monomethyl ether in the same manner. The CWS contents of the samples which had been heat-treated for 0.5, 1 and 2 hours, respectively, were found to be 5.8, 3.1 and 1.5% and the FW values were 35%, 50% and 50%, respectively.

Example 5

A solution of 87 parts of a mixture of vinyl acetate (99%) and methyl methacrylate (1%) in 13 parts of methanol was polymerized continuously in the presence of 0.1% azobisisobutyronitrile at about 75° C. and a pressure of 8 p.s.i.g. to about 50% conversion, following which unpolymerized monomers were removed by stripping with methanol vapors. The resulting copolymer of about 98% vinyl acetate and 2% methyl methacrylate was alcoholyzed in methanol in the presence of sodium methylate as catalyst, to give a granular modified polyvinyl alcohol which, after neutralizing the catalyst, had a composition corresponding to a terpolymer of 95.7% vinyl alcohol, 0.3% vinyl acetate and 4% methyl methacrylate, the latter being present in its lactone form. The modified polyvinyl alcohol had a viscosity of 28 cps. (4% solution in water at 20° C.).

Samples of the above modified polyvinyl alcohol (modified), samples of a 99.7% alcoholyzed polyvinyl alcohol (99.7%) having a viscosity of 30 cps. (4% solution in water at 20° C.), and samples of two lots of 98% alco-

TABLE III.—HEAT TREATMENTS OF 99.7% ALCOHOLYZED POLYVINYL ALCOHOL

| Test | Solvent composition | | | Temp., 0° C. | Time, min. | Final CWS cont., percent | Final FW val., percent |
|---|---|---|---|---|---|---|---|
| | MeOH, gm. | MeOAc, gm. | H₂O, gm. | | | | |
| A-1 | 60 | 40 | | 98 | 15 | 12.0 | 45 |
| A-2 | 60 | 40 | | 98 | 30 | 8.0 | 50 |
| A-3 | 60 | 40 | | 98 | 60 | 3.0 | 58 |
| A-4 | 60 | 40 | | 98 | 120 | 1.5 | 60 |
| B-1 | 60 | 40 | 5 | 98 | 15 | 7.0 | 52 |
| B-2 | 60 | 40 | 5 | 98 | 30 | 4.5 | 56 |
| B-3 | 60 | 40 | 5 | 98 | 60 | 2.9 | 58 |
| B-4 | 60 | 40 | 5 | 98 | 120 | 1.7 | 60 |
| C-1 | 60 | 40 | 10 | 98 | 15 | 4.1 | 54 |
| C-2 | 60 | 40 | 10 | 98 | 30 | 2.3 | 56 |
| C-3 | 60 | 40 | 10 | 98 | 60 | 1.3 | 60 |
| C-4 | 60 | 40 | 10 | 98 | 120 | 0.7 | 60 |

Example 4

Twenty-gram samples of a polyvinyl alcohol which was 98.5% alcoholyzed and had an initial CWS content of 37% and an FW value of 0%, were dispersed in 100-gram portions of ethylene glycol monomethyl ether and heated for 0.5, 1 and 2 hours at 124° C., following which the samples were filtered and washed with methyl acetate and vacuum dried as indicated in Example 1. The CWS contents of the heat-treated samples were then found to be 2.8%, 1.3% and 1.1%, respectively, with the FW holyzed polyvinyl alcohols (98%, Lots 1 and 2) having a viscosity of 24 cps. (4% solution in water at 20° C.) were then subjected to heat treatments in various solvent media and also under various conditions in the dry state. The 99.7% and 98% alcoholyzed materials were obtained by the alcoholysis of vinyl acetate homopolymers. All of the samples were originally dried at 90° C. before any of the heat treatments. Where the heat treatment was carried out in a solvent medium, 20 grams of the product was dispersed in the solvent in carrying out the test. The heat treatments (H.T.) carried out and the results obtained are reported in Table IV.

acetate with an amount of methyl methacrylate such that the polyvinyl alcohol product will contain not more than

TABLE IV.—HEAT TREATMENT AT 95° C. FOR 2 HOURS

| | Polyvinyl alcohol product | | | | | | | |
|---|---|---|---|---|---|---|---|---|
| | Modified | | 99.7% | | 98%, Lot 1 | | 98%, Lot 2 | |
| Heat treatment | CWS cont., percent | FW val., percent | CWS cont., percent | FW val., percent | CWS cont., percent | FW val., percent | CWS cont., percent | FW val., percent |
| None (controls) | 53.9 | 0 | 23.2 | 6 | 39.3 | 0 | 58.1 | 0 |
| Solvent medium: | | | | | | | | |
| Methanol | 3.6 | 58 | 1.4 | 52 | 3.8 | 46 | | |
| Absolute ethanol | 28 | 1 | 4.6 | 43 | 25 | 0 | | |
| 95% ethanol | | | 5.2 | 51 | 7.4 | 31 | | |
| n-Propanol | 38.5 | 0 | 4.8 | 43 | | | 42.3 | 0 |
| 2-propanol | 40.2 | 0 | 8.7 | 36 | 37.2 | 0 | | |
| n-Butanol | 41 | 0 | 10.2 | 36 | 38.9 | 0 | | |
| Isobutanol | 50.2 | 0 | 9.8 | 35 | 38.3 | 0 | | |
| n-Amyl alcohol | 48.3 | 0 | 12.4 | 33 | 41.2 | 0 | | |
| n-Hexyl alcohol | 39.5 | 0 | 11 | 33 | 36.9 | 0 | | |
| Tetrahydrofurfuryl alcohol | 32.1 | 7 | 5.7 | 39 | 24 | 0 | | |
| Benzene | 43.6 | 0 | 15.6 | 20 | 38.8 | 0 | | |
| Ethylene glycol monomethyl ether | | | 4.6 | 46 | 26.5 | 0 | | |
| Ethylene glycol monomethyl ether | | | | | 38 | 0 | | |
| n-Hexane | | | 14.4 | 25 | | | | |
| Dry heating: | | | | | | | | |
| 2 hrs. at 95° C. in sealed bomb | 52.3 | 0 | 15.1 | 28 | | | 42.5 | 5 |
| 2 hrs. at 95° C. in sealed bomb* | | | | | | | 51.2 | 3 |
| No H.T., but redried in vac. at 65° C. for 24 hrs | 59.8 | 0 | 23.2 | 7 | 39.6 | 4 | 58.1 | 2 |
| No H.T., but redried in forced air at 125° C. for ½ hr | 53.8 | 0 | 19.5 | 7 | | | | |
| No H.T., but redried in forced air at 90° C. for ½ hr | | | | | | | 58.7 | 4 |

* Redried in forced air for 30 min. at about 90° C. prior to the heat treatment.

The data of Table IV demonstrates that methanol is outstanding among the solvents shown for use as the heat treating medium, with respect to both reducing the CWS content and increasing the FW value. The data also show that heat treatments effected with the polyvinyl alcohol in the dry state were not significantly effective in either respect.

I claim:

1. The method of reducing the cold water solubles content and/or the cold water imbibing tendency of a polyvinyl alcohol which is 93 to 100% alcoholized and thereby improving its cold water slurrying properties while maintaining its solubility in 80° C.–100° C. water, comprising heating at a temperature of 70 to 190° C. a dispersion of said polyvinyl alcohol in a liquid solvent comprising 30 to 100% by weight methanol, 0 to 13% by weight water, and 0 to 45% by weight of a solvent from the group consisting of 2 to 5 carbon monohydric alcohols, esters, ketones, ethers, hydrocarbons and chlorohydrocarbons in which said polyvinyl alcohol is insoluble.

2. The method of claim 1 wherein the solvent in which the polyvinyl alcohol is dispersed consists essentially of methanol and up to 10% by weight water.

3. The method of claim 1 wherein the solvent in which the polyvinyl alcohol is dispersed consists essentially of 30 to 100% by weight methanol, up to 10% by weight water and up to 45% by weight methyl acetate.

4. The method of claim 1 wherein the solvent in which the polyvinyl alcohol is dispersed consists essentially of methanol and 5 to 10% by weight water.

5. The method of claim 1 wherein the solvent in which the polyvinyl alcohol is dispersed consists essentially of methanol.

6. The method of claim 1 wherein the solvent in which the polyvinyl alcohol is dispersed consists essentially of methanol and up to 45% by weight methyl acetate.

7. The method of claim 1 wherein the polyvinyl alcohol is a product of the alcoholysis of a copolymer of vinyl acetate with an amount of methyl methacrylate such that the polyvinyl alcohol product will contain not more than 6 weight percent of methyl methacrylate present in its lactone form.

8. The method of claim 1 wherein the dispersion of polyvinyl alcohol is heated at a temperature of 90 to 150° C.

9. The method of claim 3 wherein the dispersion of polyvinyl alcohol is heated at a temperature of 90 to 150° C.

10. The method of claim 5 wherein the dispersion of polyvinyl alcohol is heated at a temperature of 100 to 150° C.

11. The method of claim 6 wherein the dispersion of polyvinyl alcohol is heated at a temperature of 100 to 150° C.

12. The method of claim 7 wherein the dispersion of the polyvinyl alcohol is heated at a temperature of 90 to 150° C.

13. The method of claim 7 wherein the solvent in which the polyvinyl alcohol is dispersed consists essentially of methanol and up to 45% by weight methyl acetate and the dispersion is heated at a temperature of 100 to 150° C.

References Cited

UNITED STATES PATENTS 2,249,514 7/1941 Berg et al. _____ 74—231
2,890,927 6/1959 Suyama et al. _____ 18—54

FOREIGN PATENTS 518,998 11/1955 Canada _____ 260—91.3

JOSEPH L. SCHOFER, Primary Examiner

S. M. LEVIN, Assistant Examiner

U.S. Cl. X.R.

260—29.6 B, 80.72, 89.1, 91.3 VA